3,310,588
PROCESS FOR THE PREPARATION OF ORGANIC PEROXIDES

Cornelis U. Kloosterman and Bouwe H. Torn Broers, Deventer, Netherlands, assignors to Koninklijke Industrieele Maatschappij vorheen Noury & van der Lande N.V., Deventer, Netherlands, a corporation of the Netherlands
No Drawing. Filed Mar. 1, 1963, Ser. No. 262,190
Claims priority, application Netherlands, Mar. 16, 1962, 276,081
4 Claims. (Cl. 260—610)

The present invention relates to a process for the preparation of organic peroxides, in which an alcohol is reacted with a hydroperoxide in the presence of an acid-reacting catalyst and the water formed during the reaction is eliminated.

In the Stedehouder et al. U.S. application Ser. No. 11,495, filed Feb. 29, 1960, there is described a process of this kind, in which the water formed during the reaction is eliminated from the reaction mixture by distillation under reduced pressure during the reaction and/or with the aid of an entrainer.

This previously known process has the relative disadvantage that the sulphuric acid preferably used as the catalyst has to be measured very carefully, as otherwise the reaction can take place in an explosive manner or undesired side reactions occur. Furthermore, when distilling off the water formed during the reaction, the temperature and the pressure need to be carefully adjusted and maintained. Therefore, in using this previously known process, careful control of the course of the reaction going on in the reaction zone as well as of the distillation conditions is absolutely necessary.

It has now been discovered (in accordance with the present invention) that if the reaction between an alcohol and a hydroperoxide takes place in the presence of a quantity of anhydrous oxalic acid which is at least equivalent to the quantity of water formed during the reaction, not only may the difficulties be avoided which attend the use of sulphuric acid as a catalyst and the elimination of water by distillation during the reaction, but also, as an important advantage of the invention, the reaction can easily be controlled and can be carried out in a very simple manner and in a very simple apparatus. The anhydrous oxalic acid "binds" the by-product water to give the well-known dihydrate, thus:

$$2H_2O + HOOC.COOH \rightarrow HOOC.COOH.2H_2O$$

Consequently, since 1 mole of each of the alcohol and hydroperoxide reactants combine with the formation of 1 mole of by-product water, the anhydrous oxalic acid is employed in the ratio of at least 0.5 mole per mole of by-product water.

As a matter of fact, if the starting material(s) is(are) moist, the quantity of anhydrous oxalic acid to be employed in the process should be correspondingly larger than the quantity which is equivalent to the water formed during the reaction. In other words, in such cases the minimum molecular ratio of 0.5 mole of anhydrous oxalic acid per mole of by-product water is deliberately increased accordingly.

The anhydrous oxalic acid employed in the process according to the present invention serves both as a dehydrating agent and at the same time as a catalyst.

Although the reaction may take place within a wide temperature range, it is preferably carried out in the range of about 20° to 60° C., and especially at 30° to 40° C.

In order that the invention may be still more readily understood, the following examples are set forth by way of illustration rather than limitation.

Example I.—Preparation of dicumylperoxide 152 g. of pure cumylhydroperoxide (1 mole) were mixed with 136 g. of pure 2-phenylpropanol-(2) (1 mole) and 45 g. of anhydrous oxalic acid and the mixture was heated to about 40° C. with stirring for 8 hours. The oxalic acid was then filtered off, washed with benzene and dried.

In order to isolate the dicumylperoxide thus obtained, 250 ml. of benzene were added to the filtrate. The benzene solution was then washed with 4 N NaOH and subsequently freed from alkali with water. After distilling off the benzene at a pressure of 15 mm. mercury until a final pot temperature of 95° C. was reached and subsequently at a pressure of 1–2 mm. until the same final pot temperature was attained, 244.5 g. of crude light-colored dicumylperoxide with a melting point of about 38° C. were obtained. After recrystallization from methanol, the melting point was 40°–41° C.

Example II.—Preparation of cumyl-tertiary-butylperoxide 129 g. of (70%) tertiary-butylhydroperoxide (1 mole) were heated to about 40° C. together with 136 g. of 2-phenylpropanol-(2) (1 mole) and 49 g. of anhydrous oxalic acid with stirring for 6 hours. The oxalic acid was then filtered off.

In order to isolate the cumyl-tertiary-butylperoxide thus obtained the filtrate was washed with 4 N NaOH and subsequently freed from alkali with water. The impurities were distilled off at a pressure of 20 mm. mercury until a final pot temperature of 50° C. was reached, and subsequently the peroxide was distilled off at the same temperature, but at a pressure of 1 mm.

192 g. of cumyl-tertiary-butylperoxide were obtained. $N_{20} = 1.4802$.

Example III.—Preparation of cumyl-diphenylmethylperoxide 21.8 g. of (70%) cumylhydroperoxide (0.1 mole) were heated to about 40° C. together with 18.4 g. of benzhydrol (0.1 mole) and 4.7 g. of anhydrous oxalic acid in 50 ml. of benzene with stirring for 7 hours. The oxalic acid was then filtered off.

In order to isolate the cumyl-diphenylmethylperoxide thus obtained, the benzene solution was washed with 4 N NaOH and subsequently freed from alkali with water. The benzene and the impurities were then distilled off at a pressure of 15 mm. mercury until a final pot temperature of 80° C. was reached, and subsequently at a pressure of 1 mm.

27 g. of crude cumyl-diphenylmethylperoxide were obtained from which white crystals were obtained, after recrystallization, having a melting point of 108.5°–109° C.

Example IV.—Preparation of cumyl-triphenylmethylperoxide 26 g. of triphenylcarbinol (0.1 mole) were heated to about 40° C. together with 21.8 g. of (70%) cumylhydroperoxide (0.1 mole) and 4.7 g. of anhydrous oxalic acid in dry benzene with stirring for 8 hours. The oxalic acid was then filtered off.

In order to isolate the cumyl-triphenylmethylperoxide thus obtained, the benzene solution was washed with 4 N NaOH and subsequently freed from alkali with water. The benzene and the impurities were distilled off at a pressure of 15 mm. mercury and subsequently at a pressure of 1 mm. mercury until a final pot temperature of 90° C. was reached.

36 g. of crude product were obtained from which white crystals were obtained, after recrystalization from methanol, having a melting point of 76°–77° C.

*Example V.—Preparation of tertiary-butyltriphenyl-methylperoxide*

26 g. of triphenylcarbinol (0.1 mole) were heated together with 12.9 g. of (70%) tertiary butylhydroperoxide (0.1 mole) and 4.9 g. of anhydrous oxalic acid in 50 ml. of benzene with stirring for 5 hours. The oxalic acid was then filtered off.

In order to isolate the tertiary-butyltriphenylmethylperoxide thus obtained, the benzene solution was washed with 4 N NaOH and subsequently freed from alkali with water. The benzene and the impurities were distilled off at a pressure of 15 mm. mercury until a final pot temperature of 90° C. was attained and subsequently at a pressure of 1 mm. mercury until the same final pot temperature was reached.

31.5 g. of crude tertiary-butyltriphenylmethylperoxide were obtained from which white crystals were obtained after recrystallization from methanol, having a melting point of 73° C.

*Example VI.—Preparation of 1,4-bis(tertiary-butyl-peroxyisopropyl) benzene*

38.8 g. of 1,4 - bis(2-hydroxyiosopropyl)benzene (0.2 mole) were heated for 8 hours together with 36.0 g. of tertiary butylhydroperoxide (0.4 mole) and 18 g. of anhydrous oxalic acid in 100 ml. of benzene. The oxalic acid was then filtered off.

In order to isolate the 1,4-bis(tertiary-butylperoxyisopropyl)benzene thus obtained, the benzene solution was washed with 4 N HCl, once more with 4 N NaOH and subsequently freed from alkali with a saturated solution of sodium chloride. The benzene was distilled off at a pressure of 15 mm. mercury in vacuum.

50 g. of crude product were obtained from which white crystals were obtained, after recrystallization from dilute ethanol, having a melting point of about 78° C.

The foregoing examples illustrate various ways in which the principle of the invention may be applied, but are not to be construed as limiting the scope of the invention as defined in the appended claims. Starting from 1,3-bis(2-hydroxyisopropyl)benzene, for instance, 1,3-bis(tertiary-butylperoxy-isopropyl)benzene with a melting point of about 52° C. was obtained in a way similar to that described in Example VI.

Since many modifications will immediately suggest themselves to those skilled in the art upon reading the foregoing description without departing from the true spirit of the invention, it is to be understood that all such modifications are deemed to fall within the scope of the following claims.

What is claimed is:

1. In a process for the preparation of organic peroxides which comprises reacting an alcohol with a hydroperoxide in the presence of an acid-reacting catalyst and eliminating the water formed during the reaction, the improvement comprising employing anhydrous oxalic acid both as a catalyst and as a dehydrating agent in a quantity sufficient to take up the water already present in the starting reaction components and the amount of water theoretically formed during the reaction, as oxalic acid dihydrate, and mechanically removing the hydrated oxalic acid.

2. A process according to claim 1, in which the anhydrous oxalic acid is employed in a quantity which is at least that represented by the ratio 0.5 mole per mole of by-product water.

3. A process according to claim 2, in which the reaction is carried out at a temperature of about 20° to 60° C.

4. A process according to claim 3, in which the temperature is from about 30° to 40° C.

References Cited by the Examiner

UNITED STATES PATENTS

| | | | |
|---|---|---|---|
| 2,586,070 | 2/1952 | Luten et al. | 260—624 |
| 2,668,180 | 2/1954 | Boardman | 260—610 |

FOREIGN PATENTS

| | | |
|---|---|---|
| 792,558 | 3/1958 | Great Britain. |
| 896,813 | 5/1962 | Great Britain. |
| 1,250,917 | 12/1960 | France. |

OTHER REFERENCES

Groggins, "Unit Processes In Organic Synthesis," (4th ed., 1952) pages 302–303.

LEON ZITVER, *Primary Examiner.*

H. G. MOORE, *Examiner.*

WERREN B. LONE, *Assistant Examiner.*